US010916910B2

(12) United States Patent
Matsumoto et al.

(10) Patent No.: US 10,916,910 B2
(45) Date of Patent: Feb. 9, 2021

(54) LINE NARROWING MODULE

(71) Applicant: Gigaphoton Inc., Tochigi (JP)

(72) Inventors: Shinichi Matsumoto, Oyama (JP); Miwa Igarashi, Oyama (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 16/571,390

(22) Filed: Sep. 16, 2019

(65) Prior Publication Data

US 2020/0014168 A1    Jan. 9, 2020

Related U.S. Application Data

(63) Continuation of application No. PCT/JP2017/016482, filed on Apr. 26, 2017.

(51) Int. Cl.
*H01S 3/13* (2006.01)
*H01S 3/137* (2006.01)
(Continued)

(52) U.S. Cl.
CPC .......... *H01S 3/137* (2013.01); *H01S 3/08009* (2013.01); *H01S 3/0811* (2013.01);
(Continued)

(58) Field of Classification Search
CPC ........ H01S 3/137; H01S 3/225; H01S 3/2251; H01S 3/2256; H01S 3/1305;
(Continued)

(56) References Cited

U.S. PATENT DOCUMENTS 5,534,970 A * 7/1996 Nakashima ......... G03F 7/70075
353/122
5,559,816 A * 9/1996 Basting ............... G03F 7/70025
372/102
(Continued)

FOREIGN PATENT DOCUMENTS

CN    101581866 A    11/2009
CN    203135202 U    8/2013
(Continued)

OTHER PUBLICATIONS

International Search Report issued in PCT/JP2017/016482; dated Aug. 1, 2017.
(Continued)

*Primary Examiner* — Kinam Park
(74) *Attorney, Agent, or Firm* — Studebaker & Brackett PC

(57) ABSTRACT

A line narrowing module includes a prism that refracts laser light in a first plane, a grating that disperses the laser light in the first plane, first to fourth elements, and a rotation mechanism and narrows the linewidth of the laser light. The second element is supported between the first and fourth elements by the first element. The rotation mechanism rotates the second element relative to the first element around an axis intersecting the first plane. The prism is located between the second and fourth elements and so supported by the second element that the rotation mechanism rotates the prism and the second element. The third element has elasticity and is compressed and located between the prism and the fourth element. The fourth element receives reaction force from the compressed third element. The second element is mechanically independent of the fourth element in the rotational direction of the rotation mechanism.

19 Claims, 11 Drawing Sheets

(51) Int. Cl.
*H01S 3/08* (2006.01)
*H01S 3/081* (2006.01)
*H01S 3/225* (2006.01)
*H01S 3/1055* (2006.01)

(52) U.S. Cl.
CPC .......... *H01S 3/0812* (2013.01); *H01S 3/1305* (2013.01); *H01S 3/08004* (2013.01); *H01S 3/1055* (2013.01); *H01S 3/225* (2013.01); *H01S 3/2251* (2013.01); *H01S 3/2256* (2013.01)

(58) Field of Classification Search
CPC ............. H01S 3/08004; H01S 3/08009; H01S 3/0811; H01S 3/0812; H01S 3/1055
See application file for complete search history.

(56) References Cited

U.S. PATENT DOCUMENTS

| | | | |
|---|---|---|---|
| 7,072,375 B2* | 7/2006 | Ariga | H01S 3/134 372/55 |
| 2002/0141464 A1* | 10/2002 | Bushida | H01S 3/225 372/32 |
| 2006/0114957 A1* | 6/2006 | Algots | G03F 7/70041 372/55 |
| 2013/0208744 A1 | 8/2013 | Kumazaki et al. | |

FOREIGN PATENT DOCUMENTS

| | | |
|---|---|---|
| JP | H05-283785 A | 10/1993 |
| JP | H11-233858 A | 8/1999 |
| JP | 2003-249708 A | 9/2003 |
| JP | 2007-047502 A | 2/2007 |
| JP | 2008-098282 A | 4/2008 |
| WO | 2006/060360 A2 | 6/2006 |

OTHER PUBLICATIONS

International Preliminary Report on Patentability and Written Opinion issued in PCT/JP2017/016482; dated Oct. 29, 2019.
An Office Action mailed by China National Intellectual Property Administration dated Oct. 13, 2020, which corresponds to Chinese Patent Application No. 201780087905.9 and is related to U.S. Appl. No. 16/571,390 with English language translation.

* cited by examiner

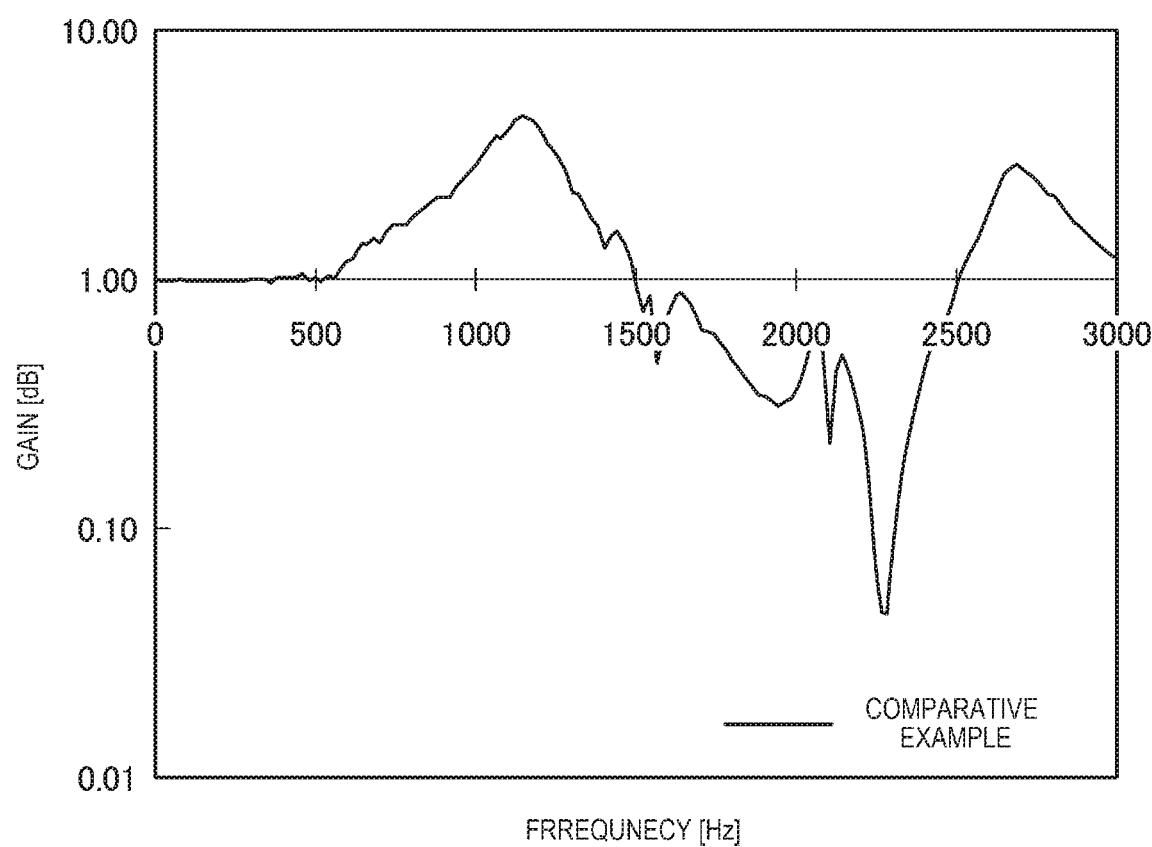

LINE NARROWING MODULE

CROSS REFERENCE TO RELATED APPLICATIONS

The present application is a continuation application of International Application No. PCT/JP2017/016482 filed on Apr. 26, 2017. The content of the application is incorporated herein by reference in its entirety.

BACKGROUND

1. Technical Field

The present disclosure relates to a line narrowing module.

2. Related Art

A semiconductor exposure apparatus is required to improve its resolution as a semiconductor integrated circuit is increasingly miniaturized and highly integrated. A semiconductor exposure apparatus is hereinafter simply referred to as an "exposure apparatus." To this end, reduction in the wavelength of the light outputted from a light source for exposure is underway. A gas laser apparatus is used as the light source for exposure in place of a mercury lamp in related art. At present, a KrF excimer laser apparatus, which outputs ultraviolet light having a wavelength of 248 nm, and an ArF excimer laser apparatus, which outputs ultraviolet light having a wavelength of 193 nm, are used as a gas laser apparatus for exposure.

As a current exposure technology, liquid-immersion exposure, in which the gap between the projection lens of the exposure apparatus and a wafer is filled with a liquid, has been put into use. In the liquid-immersion exposure, since the refractive index of the gap changes, the apparent wavelength of the light from the light source for exposure is shortened. In the liquid-immersion exposure with an ArF excimer laser apparatus as the light source for exposure, the wafer is irradiated with ultraviolet light having a wavelength of 134 nm in water. The technology described above is called ArF liquid-immersion exposure. The ArF liquid-immersion exposure is also called ArF liquid-immersion lithography.

Since KrF and ArF excimer laser apparatuses each have a wide spectral linewidth ranging from about 350 to 400 pm in spontaneous oscillation, the chromatic aberrations occur in association with the laser light (ultraviolet light) projected with the size of the laser light reduced onto the wafer via the projection lens of the exposure apparatus, resulting in a decrease in the resolution. To avoid the decrease in resolution, the spectral linewidth of the laser light outputted from the gas laser apparatus needs to be narrow enough to make the chromatic aberrations negligible. The spectral linewidth is also called a spectral width. A line narrowing module including a line narrowing element is therefore provided in the laser resonator of the gas laser apparatus, and the line narrowing module narrows the spectral width. The line narrowing element may, for example, be an etalon or a grating. A laser apparatus having a narrowed spectral width as described above is called a narrow-linewidth laser apparatus.

CITATION LIST

Patent Literature

[PTL 1] JP-A-2003-249708
[PTL 2] US 2013/0208744 A1
[PTL 3] WO 2006/060360
[PTL 4] JP-A-2007-047502

SUMMARY

A line narrowing module according to a viewpoint of the present disclosure includes a prism configured to refract laser light in a first plane and a grating configured to disperse the laser light in the first plane and narrows a linewidth of the laser light. The line narrowing module further includes a first element, a rotation mechanism, a second element, a third element, and a fourth element. The second element is supported between the first element and the fourth element by the first element. The rotation mechanism is configured to rotate the second element relative to the first element around an axis that intersects the first plane. The prism is located between the second element and the fourth element and so supported by the second element that the rotation mechanism rotates the prism along with the second element. The third element has elasticity and is compressed and located between the prism and the fourth element. The fourth element receives reaction force from the compressed third element. The second element is mechanically independent of the fourth element in a direction of rotation caused by the rotation mechanism.

A line narrowing module according to another viewpoint of the present disclosure includes a prism configured to refract laser light in a first plane and a grating configured to disperse the laser light in the first plane and narrows a linewidth of the laser light. The line narrowing module further includes a first element, a rotation mechanism, a second element, a third element, a fourth element, and a fifth element. The second element is supported between the first element and the fourth element by the first element. The rotation mechanism is configured to rotate the second element relative to the first element around an axis that intersects the first plane. The prism is located between the second element and the fourth element and so supported by the second element that the rotation mechanism rotates the prism along with the second element. The third element has elasticity and is compressed and located between the prism and the fourth element. The fourth element receives reaction force from the compressed third element. The fifth element is fixed to the second element. The fourth element has a hole accepting part of the fifth element. A gap is present in a direction of rotation caused by the rotation mechanism between the hole and the fifth element in the hole.

A line narrowing module according to another viewpoint of the present disclosure includes a prism configured to refract laser light in a first plane and a grating configured to disperse the laser light in the first plane and narrows a linewidth of the laser light. The line narrowing module further includes a first element, a rotation mechanism, a second element, a third element, a fourth element, and a sixth element. The second element is supported between the first element and the fourth element by the first element. The rotation mechanism is configured to rotate the second element relative to the first element around an axis that intersects the first plane. The prism is located between the second element and the fourth element and so supported by the second element that the rotation mechanism rotates the prism along with the second element. The third element has elasticity and is compressed and located between the prism and the fourth element. The fourth element receives reaction force from the compressed third element. The sixth element is fixed to each of the first element and the fourth element.

BRIEF DESCRIPTION OF THE DRAWINGS

Embodiments of the present disclosure will be described below only by way of example with reference to the accompanying drawings.

FIG. 6 is a gain diagram showing the frequency characteristic of rotational control performed on the prism 14c in Comparative Example.

DETAILED DESCRIPTION

Contents

Figure 1:
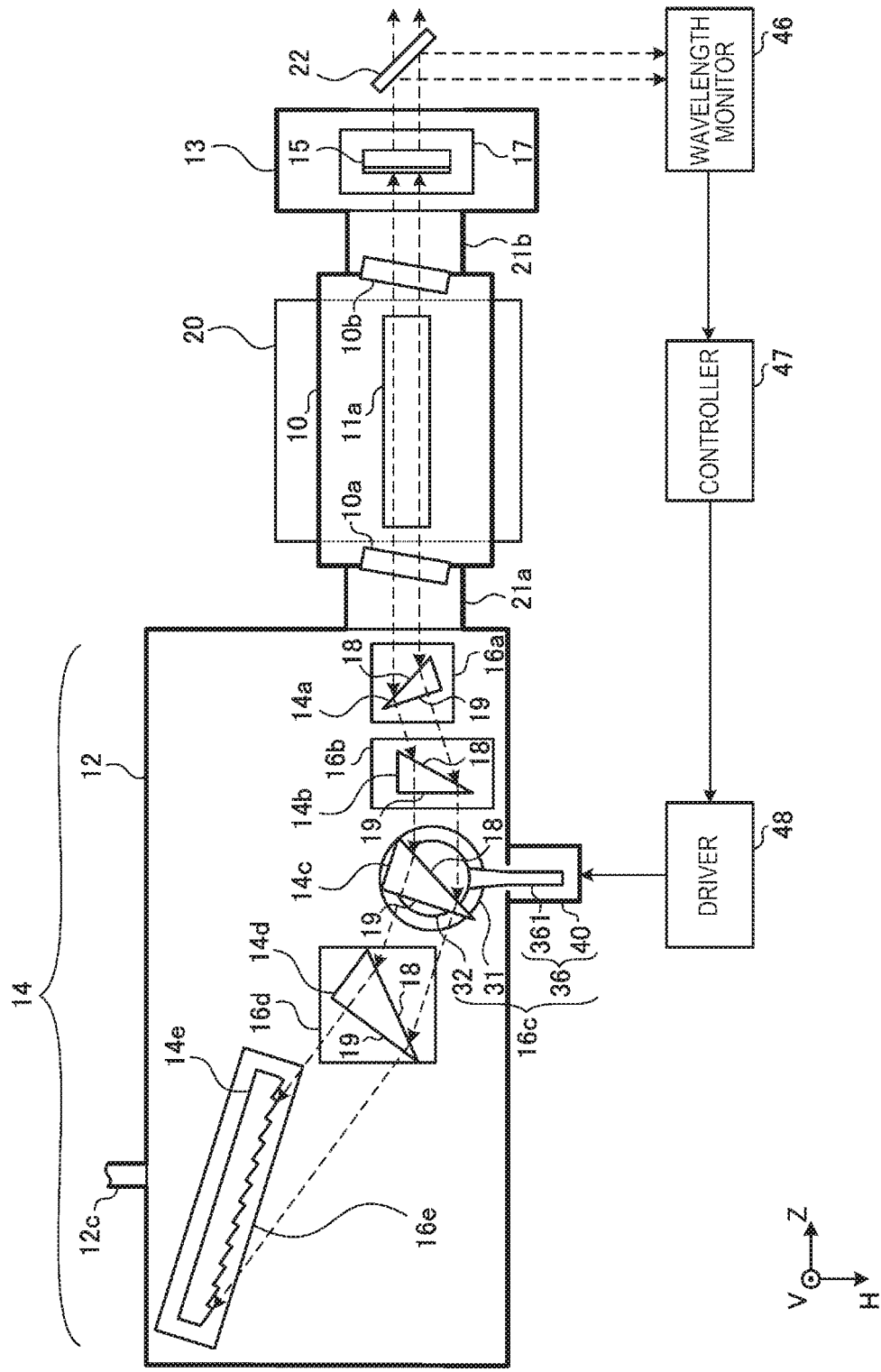
FIG. 1 diagrammatically shows the configuration of a laser apparatus including a line narrowing module according to Comparative Example.

1. Comparative Example
1.1 Configuration of laser apparatus
1.1.1 Laser chamber
1.1.2 Line narrowing module
1.1.3 Output coupling mirror
1.2 Operation
1.3 Details of holders
1.4 Problems
2. Holder that supports upper plate in such a way that upper plate is freely rotatable
2.1 Configuration
2.2 Effects
3. Alternative configuration of stepped bolts
4. Holder that fixes tall-head bolts to first plate
4.1 Configuration
4.2 Effects
5. Holder integrated with enclosure
6. Others Embodiments of the present disclosure will be described below in detail with reference to the drawings. The embodiments described below show some examples of the present disclosure and are not intended to limit the contents of the present disclosure. Further, all configurations and operations described in the embodiments are not necessarily essential as configurations and operations in the present disclosure. The same component has the same reference character, and no redundant description of the same component will be made.

1. Comparative Example 1.1 Configuration of Laser Apparatus

Figure 2:
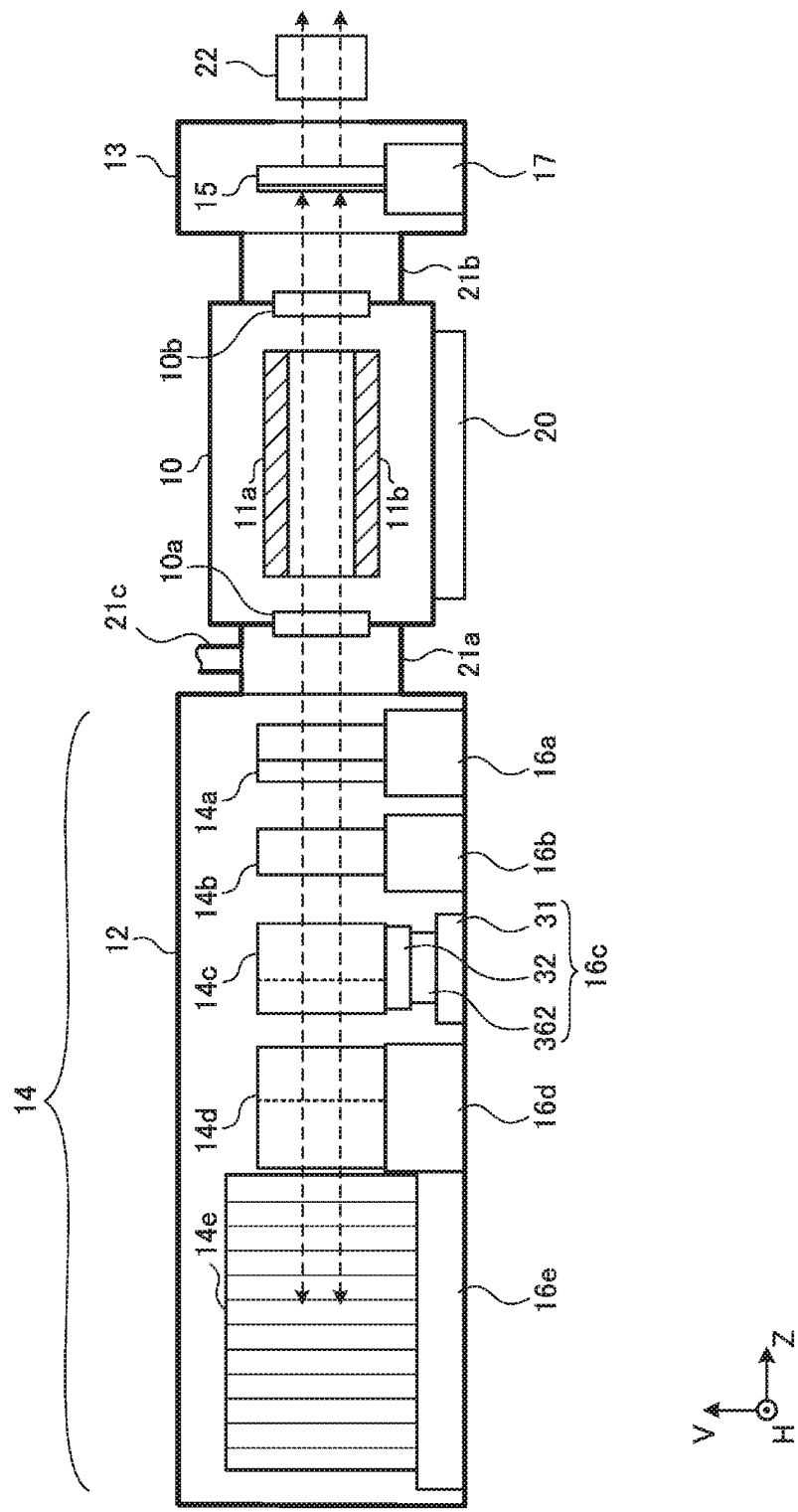
FIG. 2 diagrammatically shows the configuration of the laser apparatus including the line narrowing module according to Comparative Example.

FIGS. 1 and 2 schematically show the configuration of a laser apparatus including a line narrowing module according to Comparative Example. The laser apparatus according to Comparative Example includes a laser chamber 10, a pair of discharge electrodes 11a and 11b, a line narrowing module 14, and an output coupling mirror 15. The laser apparatus further includes a beam splitter 22, a wavelength monitor 46, a controller 47, and a driver 48. The line narrowing module 14 and the output coupling mirror 15 form an optical resonator. The laser chamber 10 is disposed in the optical path of the optical resonator. The laser apparatus is a master oscillator that outputs laser light caused to enter an exposure apparatus that is not shown.

FIG. 1 shows the internal configuration of the laser apparatus viewed along a direction substantially parallel to the direction in which discharge occurs between the discharge electrodes 11a and 11b. FIG. 2 shows the internal configuration of the laser apparatus viewed along a direction substantially perpendicular to the direction in which discharge occurs between the discharge electrodes 11a and 11b and further substantially perpendicular to the traveling direction of the laser light outputted from the output coupling mirror 15. The traveling direction of the laser light outputted from the output coupling mirror 15 is called a direction Z. The direction in which discharge occurs between the discharge electrodes 11a and 11b is called a direction V. The direction perpendicular to the directions Z and V is called a direction H. The direction −V substantially coincides with the direction of gravity.

1.1.1 Laser Chamber

The laser chamber 10 is a chamber that encapsulates a laser gas as a laser medium. The laser gas contains, for example, argon gas or krypton gas as a rare gas, fluorine gas as a halogen gas, neon gas as a buffer gas, and other gases. Windows 10a and 10b are provided on opposite ends of the laser chamber 10. The laser chamber 10 is supported by a holder 20.

The pair of discharge electrodes 11a and 11b are disposed in the laser chamber 10 as electrodes that produce discharge for exciting the laser medium. A pulsed-power module that is not shown applies pulsed high voltage to the pair of discharge electrodes 11a and 11b.

The windows 10a and 10b are so disposed that the light incident plane of each of the windows is substantially parallel to the plane HZ and the angle of incidence of the light incident on the windows is substantially equal to Brewster's angle, as shown in FIG. 1.

1.1.2 Line Narrowing Module

The line narrowing module 14 includes at least one prism, a grating 14e, holders 16a to 16e, and an enclosure 12. The at least one prism includes four prisms 14a to 14d.

The four prisms 14a to 14d are each made of calcium fluoride crystal. The four prisms 14a to 14d each have two surfaces 18 and 19, through which a beam passes. The prisms are each so disposed that the beam passing through the surface 18 is non-perpendicular to the surface 18 and the beam passing through the surface 19 is substantially perpendicular to the surface 19. The beam is refracted at the surface 18, and the beam is not refracted at the surface 19. The surface 18 is coated with a film that suppresses reflection of P-polarized light. The surface 19 is coated with a film that suppresses reflection of light. The grating 14e is an echellette grating having a surface which is made of a high reflectance material and has a large number of grooves formed at predetermined intervals.

The enclosure 12 accommodates the prisms 14a to 14d and the grating 14e. The prism 14a is supported by the holder 16a. The prism 14b is supported by the holder 16b. The prism 14c is supported by the holder 16c. The prism 14d is supported by the holder 16d. The grating 14e is supported by the holder 16e.

The holder 16c, which supports the prism 14c, includes a lower plate 31, a support plate 32 and a rotation mechanism 36. The lower plate 31 is fixed to the enclosure 12. The prism 14c is supported by the support plate 32. The rotation mechanism 36 includes a lever 361 and an enclosure 40 (see FIG. 1) and a bearing 362 (see FIG. 2), as will be described later. The lever 361 passes through a side wall of the enclosure 12, and the front end of the lever 361 is located in the enclosure 40. The bearing 362 is located between the lower plate 31 and the support plate 32 and supported by the lower plate 31.

The enclosure 12 is connected to the laser chamber 10 via an optical path tube 21a. The interior of the optical path tube 21a communicates with the interior of the enclosure 12. An inert gas introduction tube 12c (see FIG. 1) is so connected to the enclosure 12 as to be separate from the optical path tube 21a. An inert gas discharge tube 21c (see FIG. 2) is connected to the optical path tube 21a. An inert gas is introduced via the inert gas introduction tube 12c into the enclosure 12 and the optical path tube 21a and discharged via the inert gas discharge tube 21c. The interiors of the enclosure 12 and the optical path tube 21a are thus filled with the inert gas.

1.1.3 Output Coupling Mirror

The output coupling mirror 15 is accommodated in an enclosure 13. The output coupling mirror 15 is supported by a holder 17 in the enclosure 13. A surface of the output coupling mirror 15 is coated with a partially reflective film.

The enclosure 13 is connected to the laser chamber 10 via an optical path tube 21b. The interior of the optical path tube 21b communicates with the interior of the enclosure 13. An inert gas introduction tube and an inert gas discharge tube that are not shown are connected to the optical path tube 21b or the enclosure 13. The interiors of the optical path tube 21b and the enclosure 13 are thus filled with the inert gas.

The beam splitter 22 is disposed in the optical path of laser light outputted from the output coupling mirror 15. The beam splitter 22 is coated with a partially reflective film that reflects part of the laser light and transmits the remainder of the laser beam.

The wavelength monitor 46 is disposed in the optical path of the laser light reflected off the beam splitter 22. The wavelength monitor 46 includes a spectrometer that is not shown, such as an etalon, and an image sensor that is not shown.

1.2 Operation

When the high voltage is applied to the space between the discharge electrodes 11a and 11b, discharge occurs between of discharge electrodes 11a and 11b. The energy of the discharge excites the laser medium in the laser chamber 10, and the laser medium transitions to a high energy level. Thereafter, when the excited laser medium transitions to a low energy level, the laser medium emits light having a wavelength according to the difference between the energy levels.

The light generated in the laser chamber 10 exits out of the laser chamber 10 via the windows 10a and 10b. The light having exited via the window 10a of the laser chamber 10 is refracted in the plane HZ by the prisms 14a to 14d and incident on the grating 14e with the beam width of the light enlarged in the direction H.

The light incident from the prisms 14a to 14d on the grating 14e is reflected off the plurality of grooves of the grating 14e and diffracted in directions according to the wavelength of the light. The light reflected off the plurality of grooves of the grating 14e is dispersed in the plane HZ. The grating 14e is disposed in the Littrow arrangement, which allows the angle of incidence of the light incident from the prisms 14a to 14d on the grating 14e to coincide with the angle of diffraction of the diffracted light having a desired wavelength. The light having the desired wavelength and wavelengths close thereto returns to the laser chamber 10 via the prisms 14a to 14d.

The prisms 14a to 14d narrow the beam width of the diffracted light from the grating 14e in the direction H and cause the light to return into the laser chamber 10 via the window 10a.

The output coupling mirror 15 transmits and outputs part of the light having exited via the window 10b of the laser chamber 10 and reflects the remainder of the light back into the laser chamber 10.

The light having exited out of the laser chamber 10 thus travels back and forth over the path between the line narrowing module 14 and the output coupling mirror 15 and is amplified whenever the light passes through the discharge space between the discharge electrodes 11a and 11b. The light is narrowed in terms of linewidth whenever the light is turned back by the line narrowing module 14. Further, the arrangement of the windows 10a and 10b and the coatings on the prisms 14a to 14d described above allow selection of the component polarized in the direction H. The thus amplified light is outputted as laser light from the output coupling mirror 15. The laser light has a wavelength that belongs to the vacuum ultraviolet region.

The beam splitter 22 transmits, at high transmittance, part of the laser light outputted from the output coupling mirror 15 and reflects the remainder of the laser light. The laser light having passed through the beam splitter 22 enters, for example, the exposure apparatus that is not shown. The laser light reflected off the beam splitter 22 is incident on the spectrometer, which is provided in the wavelength monitor 46 but is not shown. The spectrometer forms interference fringes of the laser light on the light reception surface of the image sensor that is provided in the wavelength monitor 46 but is not shown. The image sensor produces image data on the interference fringes and transmits the image data to the controller 47.

The controller 47 receives data on a target wavelength from a controller of the exposure apparatus that is not shown. The controller 47 further receives the image data from the wavelength monitor 46 and calculates the wavelength of the laser light based on the image data. The controller 47 transmits a control signal to the driver 48 based on the data on the target wavelength and the calculated wavelength of the laser light. The driver 48 receives the control signal from the controller 47. The driver 48 transmits a drive signal to the rotation mechanism 36 based on the control signal.

The rotation mechanism 36 rotates the lever 361 provided in the rotation mechanism 36 clockwise or counterclockwise in FIG. 1 in accordance with the drive signal from the driver 48. When the lever 361 rotates, the support plate 32 rotates relative to the lower plate 31 around an axis perpendicular to the plane HZ, and the prism 14c rotates in the plane HZ accordingly. The prism 14c is rotated so that the attitude thereof is adjusted, and the angle of incidence of the light incident on the grating 14e is therefore adjusted. The oscillation wavelength is thus adjusted.

1.3 Details of Holders

Figure 3:
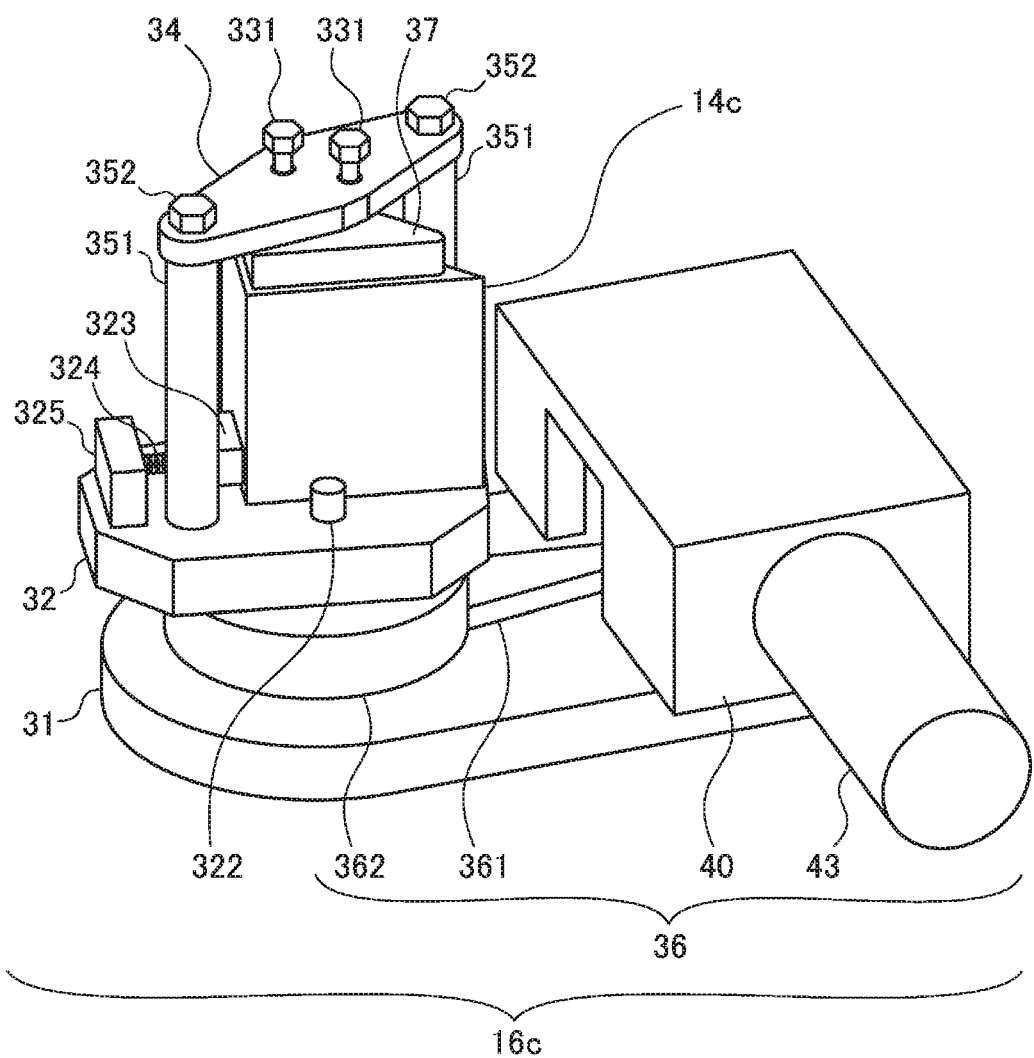
FIG. 3 is an enlarged perspective view showing the configuration of a prism 14c and a holder 16c in Comparative Example.
Figure 4:
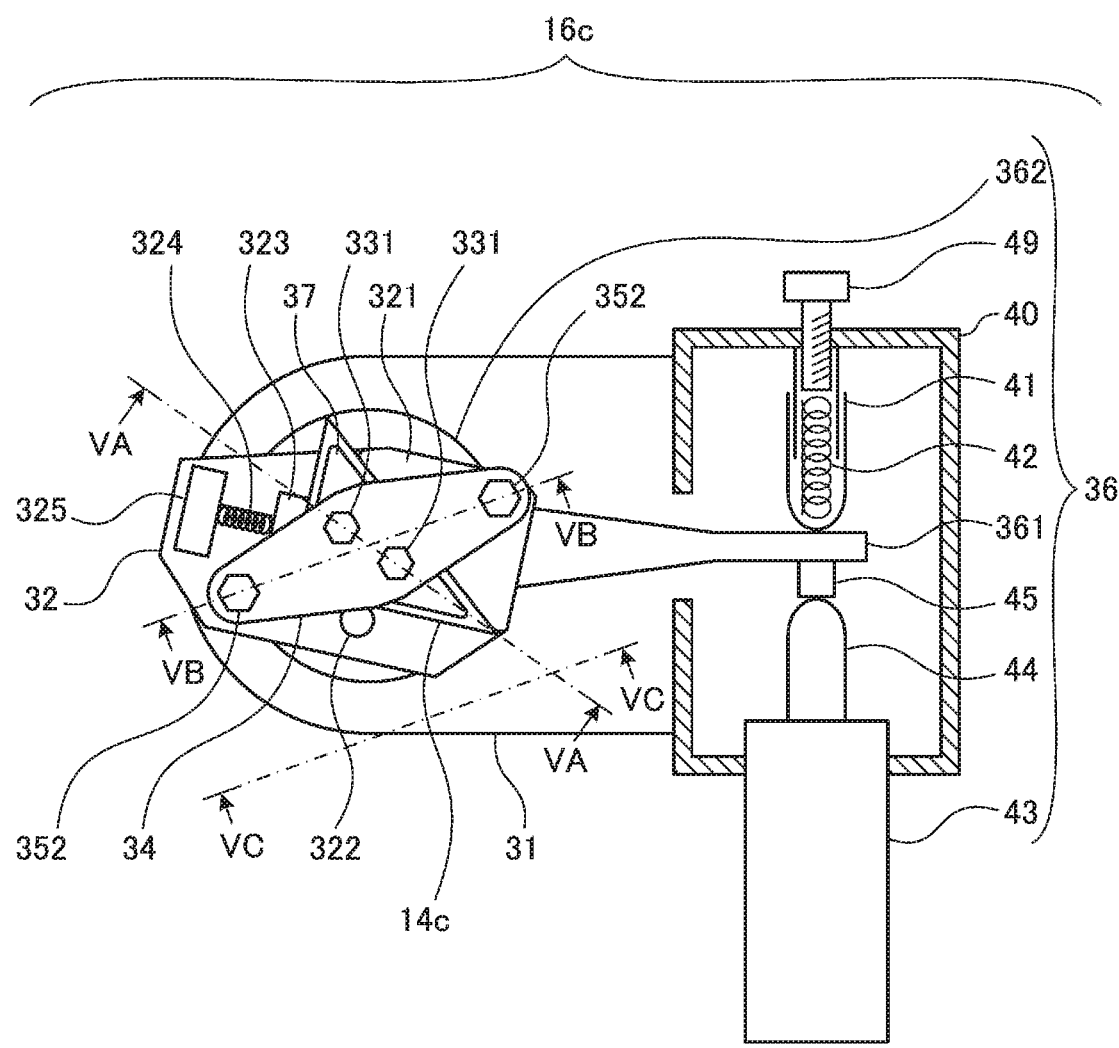
FIG. 4 is a plan view of the configuration of the prism 14c and the holder 16c in Comparative Example.
Figure 5A:
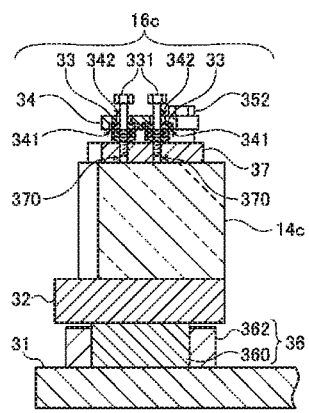
FIGS. 5A to 5C are cross-sectional views of part of the prism 14c and the holder 16c in Comparative Example.
Figure 5B:
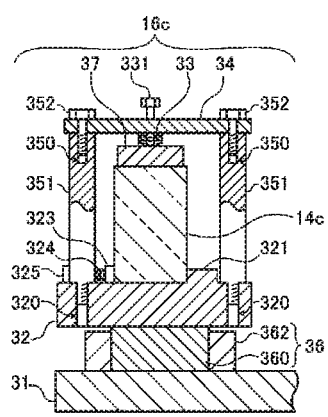
Figure 5C:
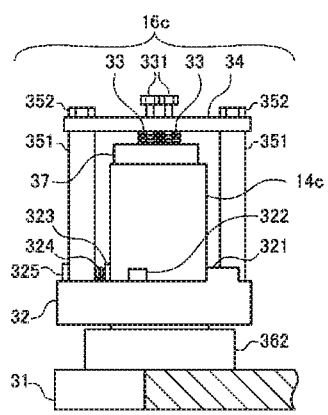

FIG. 3 is an enlarged perspective view showing the configuration of the prism 14c and the holder 16c in Comparative Example described above. FIG. 4 is a plan view of the prism 14c and the holder 16c in Comparative Example. In FIG. 4, the enclosure 40 and a plunger 41 are shown in the form of cross section. FIGS. 5A to 5C are cross-sectional views of part of the prism 14c and the holder 16c in Comparative Example. FIG. 5A corresponds to the cross section taken along the line VA-VA in FIG. 4. FIG. 5B corresponds to the cross section taken along the line VB-VB in FIG. 4. FIG. 5C corresponds to the cross section taken along the line VC-VC in FIG. 4. In FIGS. 5A and 5B, the entirety or part of bolts are each drawn in the form of the surface thereof instead of a cross section thereof.

The holder 16c includes the lower plate 31, the rotation mechanism 36, and the support plate 32 described above. The holder 16c further includes a plurality of springs 33 (see FIGS. 5A to 5C), an upper plate 34, a plurality of tall-head volts 351, and a prism clamp 37.

The rotation mechanism 36 includes a rotary plate 360 (see FIGS. 5A and 5B). The rotary plate 360 is so supported as to be rotatable inside the bearing 362 described above. The support plate 32 described above is fixed to the upper surface of the rotary plate 360. The lever 361 described above (see FIGS. 1, 3, and 4) is fixed to the rotary plate 360. A first end of the lever 361 is fixed to the rotary plate 360. A second end of the lever 361 is located in the enclosure 40 described above. The enclosure 40 is fixed to the lower plate 31. Although not shown, the first and second ends of the lever 361 are linked to each other in the space below the bearing 362. The configuration described above allows the lever 361 to rotate integrally with the rotary plate 360.

The rotation mechanism 36 further includes the plunger 41, an automatic micrometer 43, and a piezoelectric device 45. The plunger 41 and the automatic micrometer 43 are attached to the enclosure 40. The plunger 41 includes a spring 42 and a screw 49. The automatic micrometer 43 includes a micrometer head 44. The piezoelectric device 45 is attached to the lever 361 in the enclosure 40. The micrometer head 44 is in contact with the piezoelectric device 45 in the enclosure 40. The piezoelectric device 45 and the lever 361 are located between the micrometer head 44 and the plunger 41.

The support plate 32 includes a thick section 321 (see FIGS. 5B and 5C) and a protrusion 322. An elastic member, such as a spring 324, is attached to the support plate 32. A plurality of bolt holes 320 are formed in the support plate 32. The thick section 321 of the support plate 32 is thicker than the other portion of the support plate 32, so that a stepped portion is formed between the thick section 321 and the other portion. The prism 14c is so placed on the support plate 32 that a first surface of the prism 14c is in contact with the stepped portion and further a second surface of the prism is in contact with the protrusion 322. The prism 14c is thus positioned with respect to the support plate 32 and supported by the support plate 32. The first surface of the prism 14c is, for example, the surface 18 described with reference to FIG. 1, and the second surface of the prism 14c is, for example, the surface 19 described with reference to FIG. 1.

A first end of the spring 324 is fixed to the support plate 32 via a support section 325. A pressing member 323 is disposed between a second end of the spring 324 and a third surface of the prism 14c. The spring 324 presses the third surface of the prism 14c via the pressing member 323. As a result, the first surface of the prism 14c is pressed against the stepped portion of the support plate 32, and the second surface of the prism 14c is pressed against the protrusion 322.

The plurality of tall-head bolts 351 include two tall-head bolts. The tall-head bolts 351 are each a bolt having a long head. Part of the head of each of the tall-head bolts 351 has undergone a cutting process of forming two substantially parallel surfaces (not shown) intended for wrench engagement.

The two tall-head bolts 351 are each so fixed to the support plate 32 that a lower-end threaded portion of the tall-head bolt 351 is screwed into the corresponding threaded hole 320 of the support plate 32, as shown in FIG. 5B. A bolt hole 350 is formed in an upper end portion of each of the tall-head bolts 351. A bolt 352 is screwed into the bolt hole 350 and fixed thereto. The upper plate 34 is sandwiched between and fixed to the upper end of each of the tall-head bolts 351 and the head of the corresponding bolt 352. The two tall-head bolts 351 specify the distance between the support plate 32 and the upper plate 34. The prism 14c is located between the two tall-head bolts 351.

The upper plate 34 has through holes in the vicinity of the opposite ends thereof, and the opposite ends of the upper plate 34 are fixed to the tall-head bolts 351 with the bolts 352, which pass through the through holes.

A plurality of through holes 342 are formed in the vicinity of the center of the upper plate 34, as shown in FIG. 5A. The plurality of through holes 342 include two through holes. Recesses 341 are so formed in the lower surface of the upper plate 34 that the recesses 341 overlap with the plurality of through holes 342. The inner diameter of each of the recesses 341 is greater than the inner diameter of the corresponding through hole 342.

The prism clamp 37 is so disposed as to be in contact with the upper surface of the prism 14c. A plurality of bolt holes 370 are formed in the prism clamp 37. The plurality of bolt holes 370 include two bolt holes.

The plurality of springs 33 include two springs. The two springs 33 have elasticity and are compressed by and disposed between the prism clamp 37 and the upper plate 34. Part of each of the two springs 33 is located in the corresponding recess 341. The compressed springs 33 press the prism 14c downward via the prism clamp 37. The upper plate 34 receives upward reaction force from the compressed springs 33. A plurality of bolts 331 pass through the through holes 342 and the springs 33 and are threaded into the bolt holes 370 of the prism clamp 37. The springs 33 therefore do not come off the recesses 341. Since the outer diameter of the shaft of each of the bolts 331 excluding the head thereof is smaller than the inner diameter of the corresponding through hole 342, the position of the through hole 342 does not exactly dictate the position of the bolt 331.

The automatic micrometer 43 described above pushes the micrometer head 44 in the direction toward the current position of the lever 361 or retracts the micrometer head 44 in the opposite direction in accordance with the drive signal from the driver 48. When the micrometer head 44 is pushed in the direction toward the current position of the lever 361, the lever 361 rotates counterclockwise in FIG. 4, and the spring 42 of the plunger 41 is compressed. When the micrometer head 44 is retracted in the direction away from the current position of the lever 361, restoring force of the compressed spring 42 rotates lever 361 clockwise in FIG. 4. Rotating the screw 49 allows adjustment of the restoration force of the spring 42.

The piezoelectric device 45 expands and contracts in accordance with the drive signal from the driver 48. The expansion or contraction of the piezoelectric device 45 rotates the lever 361, as in the case where the automatic micrometer 43 is driven. The automatic micrometer 43 is suitable for large-stroke and low-vibration-frequency movement as compared with the piezoelectric device 45, whereas the piezoelectric device 45 is suitable for small-stroke and high-vibration-frequency movement as compared with the automatic micrometer 43. The lever 361 rotates integrally at least with the rotary plate 360, the support plate 32, the prism 14c, the tall-head bolts 351, and the upper plate 34.

1.4 Problems

FIG. 6 is a gain diagram showing the frequency characteristic of rotational control performed on the prism 14c in Comparative Example described above. The horizontal axis of FIG. 6 represents the frequency of the drive signal transmitted to the rotation mechanism 36 of the holder 16c. The vertical axis of FIG. 6 represents the gain of the rotational control performed on the prism 14c. The gain used herein is a value produced by measuring the ratio of the amplitude representing the angle of rotation of the prism 14c to the amplitude of the drive signal transmitted to the rotation mechanism 36 of the holder 16c and converting the ratio into a value expressed in decibel.

In a band where the frequency of the drive signal ranges from about 0 to 500 Hz, the gain is substantially one, as shown in FIG. 6. That is, in the relatively low-frequency control, in which the angle of rotation of the prism 14c substantially faithfully corresponds to the amplitude of the drive signal, it can be said that good control state is achieved.

When the frequency of the drive signal is higher than 500 Hz, the gain is higher than 1 dB in some cases. The state described above is a state in which the angle of rotation of the prism 14c is too large to the amplitude of the drive signal. For example, it is conceivable in the state that the frequency of the drive signal substantially coincides with or is substantially an integral multiple of the natural frequency of any one of the parts that form the prism 14c and the holder 16c or the natural frequency of the component that is the combination of two or more of the parts, resulting in resonance.

Further, when the frequency of the drive signal is higher than 1500 Hz, the gain is smaller than 1 dB in some cases. The state described above is a state in which the angle of rotation of the prism 14c is too small to the amplitude of the drive signal and is called dissonance.

Further, when the frequency of the drive signal is higher than 2500 Hz, the gain is higher than 1 dB in some cases. It is believed that resonance occurs also in the band higher than 2500 Hz.

As described above, if resonance or dissonance occurs in the case where the attitude of the prism 14c is adjusted in high-frequency control, the responsiveness of the control deteriorates, and it is difficult to adjust the attitude of the prism 14c with precision. As a result, it is difficult to control the wavelength of the pulsed laser light with precision, resulting in degradation of stability of the wavelength in some cases.

In an embodiment described below, for example, supporting the upper plate 34 in such a way that the upper plate 34 can be freely rotatable suppresses resonance or dissonance, whereby high-precision wavelength control is achieved.

Figure 7A:
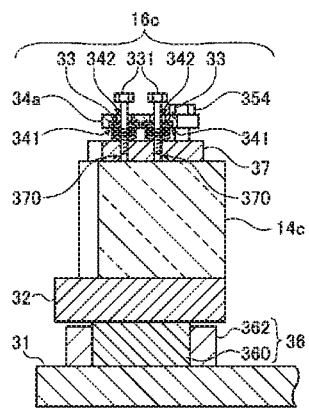
FIGS. 7A to 7C are cross-sectional views of part of the prism 14c and the holder 16c in a line narrowing module according to a first embodiment.
Figure 7B:
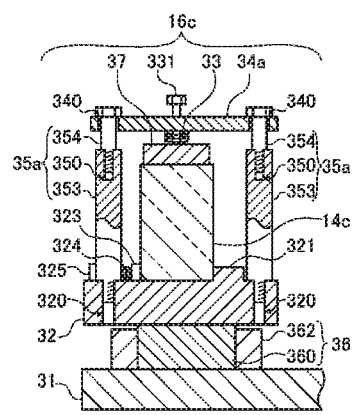
Figure 7C:
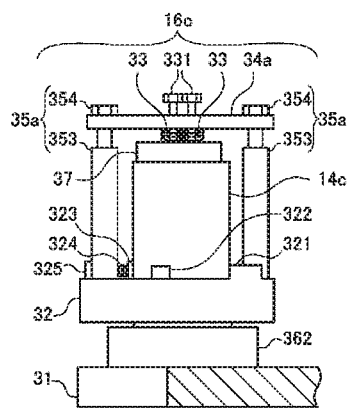

2. Holder that Supports Upper Plate in Such a Way that Upper Plate is Freely Rotatable 2.1 Configuration FIGS. 7A to 7C are cross-sectional views of part of the prism 14c and the holder 16c in the line narrowing module according to a first embodiment. FIG. 7A corresponds to the cross section taken along the line VA-VA in FIG. 4. FIG. 7B corresponds to the cross section taken along the line VB-VB in FIG. 4. FIG. 7C corresponds to the cross section taken along the line VC-VC in FIG. 4. In FIGS. 7A and 7B, the entirety or part of bolts are each drawn in the form of the surface thereof instead of a cross section thereof.

The line narrowing module according to the first embodiment differs from the line narrowing module according to Comparative Example described above in terms of the structure in which columns 35a including tall-head bolts 353 and stepped bolts 354 support an upper plate 34a. The other points are the same as those in Comparative Example. In the present disclosure, the same configurations as those shown in FIGS. 1 to 4 are described in some cases with reference to FIGS. 1 to 4.

The tall-head bolts 353 are each so fixed to the support plate 32 that a lower-end threaded portion of the tall-head bolt 353 is screwed into the corresponding bolt hole 320 of the support plate 32. The stepped bolts 354 are each a bolt having a shoulder between an upper-end head portion and a lower-end threaded portion. The threaded portion of each of the stepped bolts 354 is threaded into and fixed to the bolt hole 350 formed in an upper end portion of the corresponding tall-head bolt 353.

Through holes 340 are formed in the vicinity of the opposite ends of the upper plate 34a. The inner diameter of each of the through holes 340 is smaller than the outer diameter of the head of each of the tall-head bolts 353 and smaller than the outer diameter of the head of each of the stepped bolts 354. Further, the inner diameter of each of the through holes 340 is greater than the outer diameter of the shoulder of each of the stepped bolts 354. A cross-section of each of the through holes 340 that is the cross-section perpendicular to the direction in which the through hole 340 extends may not have a circular shape and may have an oval shape elongated in the direction of rotation of the rotary plate 360. It is desirable that the inner diameter of each of the through holes 340 in the direction of rotation of the rotary plate 360 is at least greater than the outer diameter of the shoulder of each of the stepped bolts 354 in the direction of rotation of the rotary plate 360. It is instead desirable that a gap at least in the direction of rotation of the rotary plate 360 is present between each of the through holes 340 and the shoulder of the stepped bolt 354 inserted into the through hole 340. The stepped bolts 354 can therefore move in the through holes 340 relative to the upper plate 34a. In particular, the stepped bolts 354 are movable in the direction of rotation of the rotary plate 360 relative to the upper plate 34a. It is, however, noted that the upper plate 34a receives upward reaction force from the springs 33, and that portions of the upper surface of the upper plate 34a that are the portions around the through holes 340 are pressed against the heads of the stepped bolts 354. The two tall-head bolts 353 and the two stepped bolts 354 therefore specify the distance between the support plate 32 and the upper plate 34a.

The lower plate 31 corresponds to a first element in the present disclosure. The support plate 32 corresponds to a second element in the present disclosure. The springs 33 correspond to a third element in the present disclosure. The upper plate 34a corresponds to a fourth element in the present disclosure. The columns 35a including the tall-head bolts 353 and the stepped bolts 354 correspond to a fifth element in the present disclosure. The first embodiment has been described with reference to the case where the first to fifth elements are members different from one another, but not necessarily. For example, the support plate 32 and the columns 35a may be integrated with each other into a single member. That is, the second and fifth elements may be integrated with each other into a single member.

The upper plate 34a, the tall-head bolts 353, and the stepped bolts 354 in the first embodiment are the same as the upper plate 34, the tall-head bolts 351, and the bolts 352 in Comparative Example, respectively, in terms of the points other than the points described above.

2.2 Effects

According to the configuration described above, the prism 14c, the support plate 32, the rotary plate 360, and the columns 35a are mechanically independent of the upper plate 34a. That is, the prism 14c and the other components are movable independently of the upper plate 34a within the range of the difference in dimension between the outer diameter of the shoulder of each of the stepped bolts 354 and the inner diameter of the corresponding through hole 340. For example, in a case where the stationary prism 14c starts rotating, the prism 14c can start moving with the upper plate 34a remaining stationary due to its inertia. Therefore, in the first embodiment, the responsiveness of the rotational control performed on the prism 14c can be improved as compared with the case where the prism 14c and the upper plate 34 are integrally rotated in Comparative Example.

In a case where the inertia force acting on the upper plate 34a with respect to the stepped bolts 354 is smaller than the frictional force between the heads of the stepped bolts 354 and the upper surface of the upper plate 34a, the upper plate 34a rotates integrally with the stepped bolts 354.

The inertia force also acts on the prism clamp 37. In a case where the inertia force acting on the prism clamp 37 with respect to the prism 14c is smaller than the frictional force between the upper surface of the prism 14c and the lower surface of the prism clamp 37, the prism clamp 37 rotates integrally with the prism 14c. Conversely, in a case where the inertia force acting on the prism clamp 37 with respect to the prism 14c is greater than the frictional force between the upper surface of the prism 14c and the lower surface of the prism clamp 37, the prism 14c is movable independently of the prism clamp 37.

Figure 8:
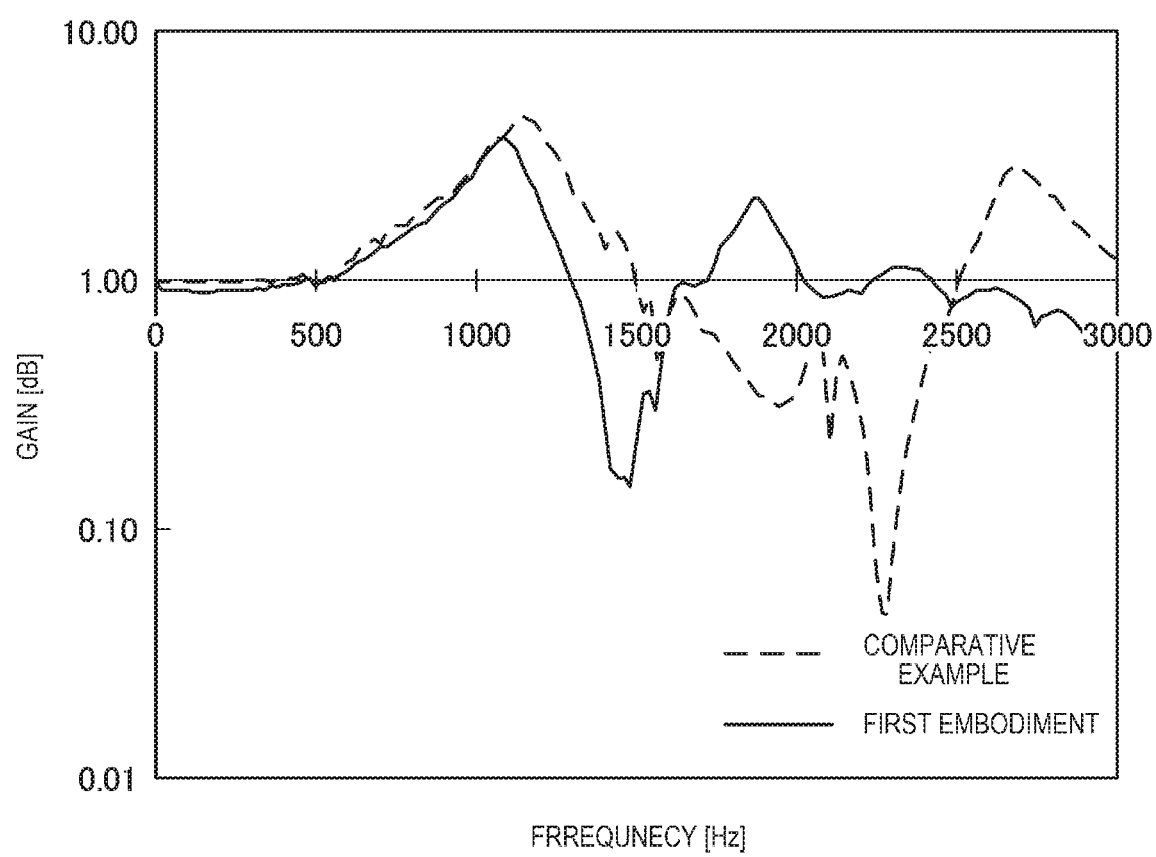
FIG. 8 is a gain diagram showing the frequency characteristic of the rotational control performed on the prism 14c in the first embodiment.

FIG. 8 is a gain diagram showing the frequency characteristic of the rotational control performed on the prism 14c in the first embodiment. FIG. 8 also shows the frequency characteristic in Comparative Example (see FIG. 6) in the form of a broken line for comparison between the first embodiment and Comparative Example.

In the first embodiment, the resonance state, in which the gain is greater than 1 dB, is hardly seen in the band where the frequency is higher than or equal to 2500 Hz and lower than or equal to 3000 Hz, as shown in FIG. 8. It is believed that the resonance in the band described above is reduced because the prism 14c and the other components are mechanically independent of the upper plate 34a.

Further, in the first embodiment, in the band where the frequency is higher than or equal to 2000 Hz and lower than or equal to 3000 Hz, the gain is stable within the range from about 0.6 to 1.0 dB. The piezoelectric device 45 is driven within the range where the frequency is higher than or equal to 2000 Hz and lower than or equal to 3000 Hz in some cases based on the result of the measurement of the wavelength of the laser light. The first embodiment is particularly effective in the case where the rotational control is performed on the prism 14c at a frequency higher than or equal to 2000 Hz and lower than or equal to 3000 Hz.

3. Alternative Configuration of Stepped Bolts

Figure 9A:
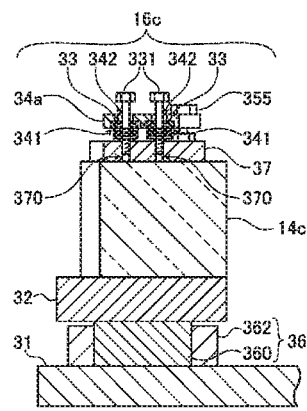
FIGS. 9A to 9C are cross-sectional views of part of the prism 14c and the holder 16c in a line narrowing module according to a second embodiment.
Figure 9B:
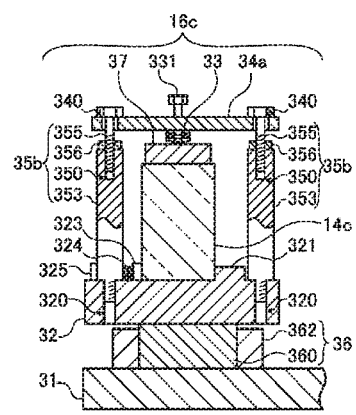
Figure 9C:
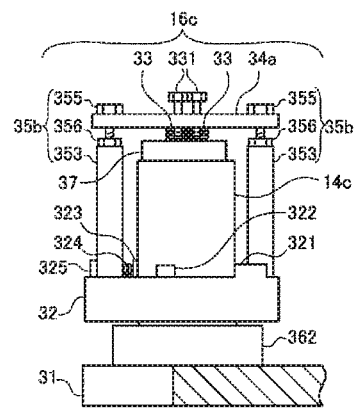

FIGS. 9A to 9C are cross-sectional views of part of the prism 14c and the holder 16c in a line narrowing module according to a second embodiment. FIG. 9A corresponds to the cross section taken along the line VA-VA in FIG. 4. FIG. 9B corresponds to the cross section taken along the line VB-VB in FIG. 4. FIG. 9C corresponds to the cross section taken along the line VC-VC in FIG. 4. In FIGS. 9A and 9B, the entirety or part of bolts are each drawn in the form of the surface thereof instead of a cross section thereof.

The stepped bolts 354 in the first embodiment are replaced with bolts 355 and nuts 356 in the line narrowing module according to the second embodiment.

The inner diameter of each of the through holes 340 formed in the vicinity of the opposite ends of the upper plate 34a is greater than the outer diameter of the shaft of the corresponding bolt 355, that is, the outer diameter of a portion of the bolt 355 excluding the head thereof. A cross-section of each of the through holes 340 that is the cross-section perpendicular to the direction in which the through hole 340 extends may not have a circular shape and may have an oval shape elongated in the direction of rotation of the rotary plate 360. It is desirable that the inner diameter of each of the through holes 340 in the direction of rotation of the rotary plate 360 is at least greater than the outer diameter of the shaft of each of the bolts 355 in the direction of rotation of the rotary plate 360. It is instead desirable that a gap at least in the direction of rotation of the rotary plate 360 is present between each of the through holes 340 and the shaft of the bolt 355 inserted into the through hole 340. The bolts 355 can therefore move in the through holes 340 relative to the upper plate 34a.

The bolts 355 are threaded into the nuts 356 and further threaded into the bolt holes 350 formed in the upper end portions of the tall-head bolts 353. When the nuts 356 are fastened with the bolts 355 threaded into the bolt holes 350 to a predetermined depth, the position of each of the bolts 355 is fixed with respect to the corresponding bolt hole 350. The distance between the support plate 32 and the upper plate 34a is thus determined. Columns 35b including the tall-head bolts 353, the bolts 355, and the nuts 356 correspond to the fifth element in the present disclosure.

The other points are the same as those in the first embodiment.

4. Holder that Fixes Tall-Head Bolts to First Plate 4.1 Configuration

Figure 10:
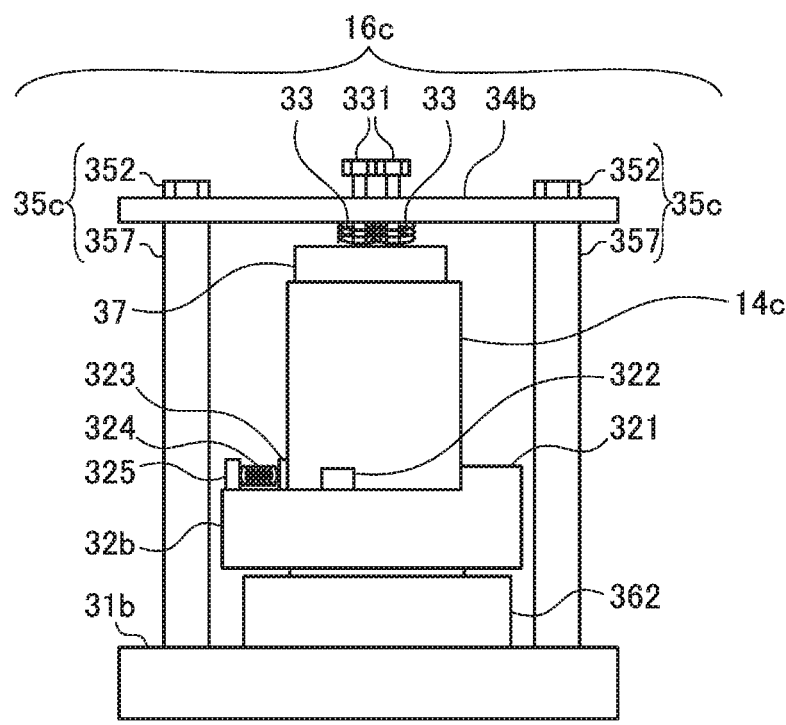
FIG. 10 is a side view of part of the prism 14c and the holder 16c in a line narrowing module according to a third embodiment.

FIG. 10 is a side view of part of the prism 14c and the holder 16c in a line narrowing module according to a third embodiment. In FIG. 10, the direction in which the prism 14c and the holder 16c are viewed is the same as the direction in which the prism 14c and the holder 16c are viewed in FIG. 5C.

The lower plate 31, the support plate 32, the upper plate 34, and the tall-head bolts 351 in Comparative Example are replaced with a lower plate 31b, a support plate 32b, an upper plate 34b, and tall-head bolts 357 in the third embodiment.

The upper plate 34b in the third embodiment is longer than the upper plate 34 in Comparative Example. The tall-head bolts 357 in the third embodiment is longer than the tall-head bolts 351 in Comparative Example. The bolt holes 320 formed in the support plate 32 in Comparative Example are not formed in the support plate 32b in the third embodiment. Instead, bolt holes that are not shown are formed in the lower plate 31b in the third embodiment. Lower-end threaded portions of the tall-head bolts 357 are not fixed to the support plate 32b, and are threaded into the bolt holes in the lower plate 31b and fixed to the lower plate 31b.

The bolts 352 are threaded into bolt holes that are formed in upper end portions of the tall-head bolts 357 but are not shown and fixed therein. The upper plate 34b is sandwiched between the upper ends of the tall-head bolts 357 and the heads of the bolts 352 and fixed thereto. The two tall-head bolts 357 specify the distance between the lower plate 31b and the upper plate 34b. Further, the two tall-head bolts 357 fix the attitude of the upper plate 34b to prevent the upper plate 34b from rotating relative to the lower plate 31b.

The through holes 342 and the recesses 341 (see FIG. 5A) are formed in the upper plate 34b. The configuration described above and the configuration of the bolts 331, the springs 33, and other portions are the same as those in Comparative Example described above.

The lever 361 rotates integrally at least with the rotary plate 360, the support plate 32b, and the prism 14c. Since both the upper plate 34b and the tall-head bolts 357 do not rotate, the prism 14c and the other components are mechanically independent of the upper plate 34b and the tall-head bolts 357.

In the case where the inertia force acting on the prism clamp 37 with respect to the prism 14c is smaller than the frictional force between the upper surface of the prism 14c and the lower surface of the prism clamp 37, the prism clamp 37 rotates integrally with the prism 14c. Conversely, in the case where the inertia force acting on the prism clamp 37 with respect to the prism 14c is greater than the frictional force between the upper surface of the prism 14c and the lower surface of the prism clamp 37, the prism 14c is movable independently of the prism clamp 37.

The lower plate 31b corresponds to the first element in the present disclosure. The support plate 32b corresponds to the second element in the present disclosure. The upper plate 34b corresponds to the fourth element in the present disclosure. Columns 35c including the tall-head bolts 357 and the bolts 352 correspond to a sixth element in the present disclosure. The third embodiment has been described with reference to the case where the first to fourth and sixth elements are members different from one another, but not necessarily. For example, the lower plate 31b and the columns 35c may be integrated with each other into a single member. That is, the first and sixth elements may be integrated with each other into a single member. For example, the upper plate 34b and the columns 35c may be integrated with each other into a single member. That is, the fourth and sixth elements may be integrated with each other into a single member. The lower plate 31b, the upper plate 34b, and the columns 35c may be integrated with each other into a single member. That is, the first, fourth, and sixth elements may be integrated with each other into a single member.

The other points are the same as those in Comparative Example.

4.2 Effects

Figure 11:
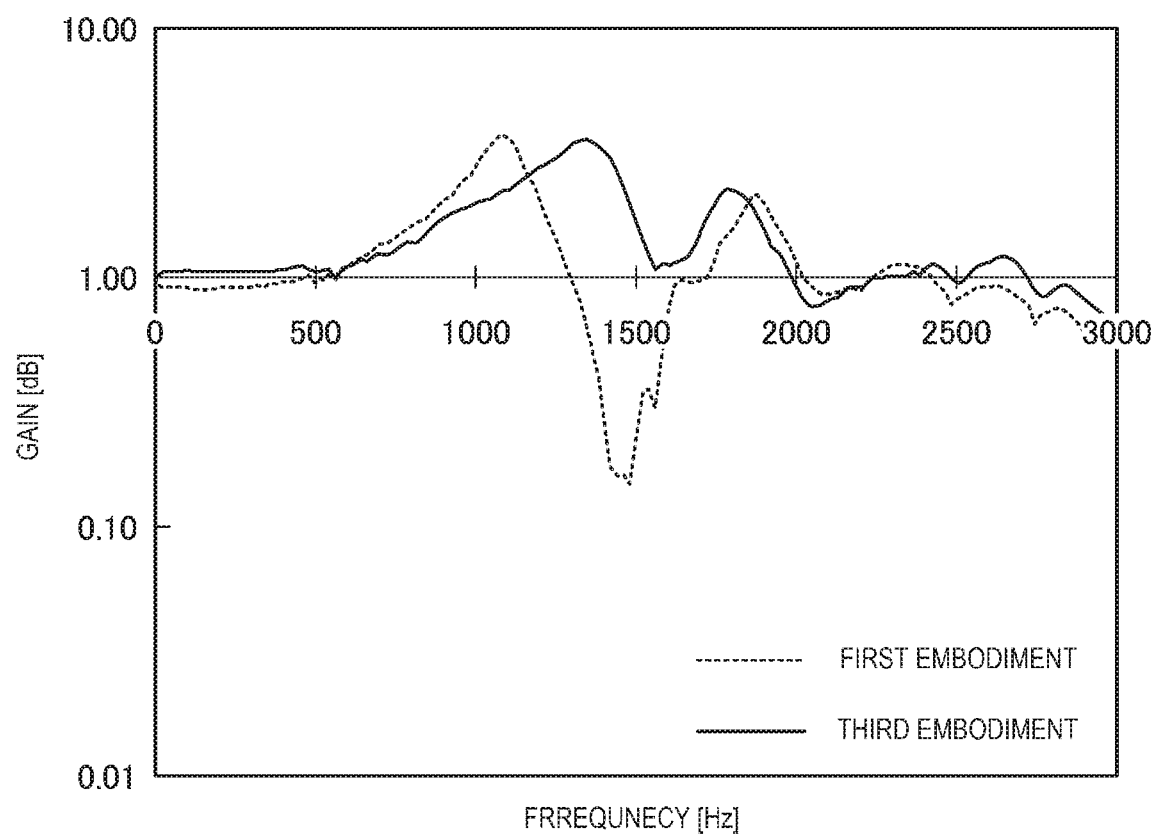
FIG. 11 is a gain diagram showing the frequency characteristic of the rotational control performed on the prism 14c in the third embodiment.

FIG. 11 is a gain diagram showing the frequency characteristic of the rotational control performed on the prism 14c in the third embodiment. FIG. 11 also shows the frequency characteristic in the first embodiment (see FIG. 8) in the form of a broken line for comparison between the third embodiment and the first embodiment.

In the third embodiment, the dissonance state, in which the gain is smaller than 1 dB in the band in the vicinity of the frequency of 1500 Hz, is hardly seen, as shown in FIG. 11. It is believed that the dissonance in the band is reduced because the upper plate 34b and the tall-head bolts 357 are fixed to the lower plate 31b. The frequency bandwidth where high responsiveness is achieved is wider than that in the first embodiment. The responsiveness of the rotational control performed on the prism 14c can therefore be improved.

5. Holder Integrated with Enclosure

Figure 12A:
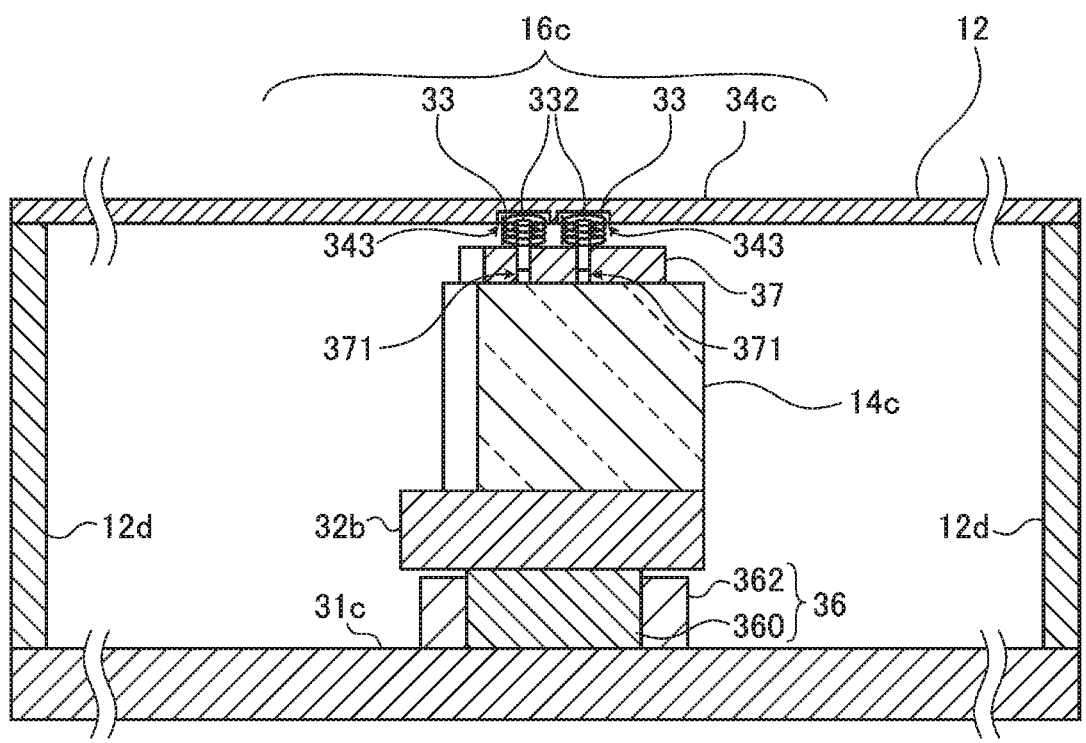
FIGS. 12A and 12B are cross-sectional views of part of the prism 14c and the holder 16c in a line narrowing module according to a fourth embodiment.
Figure 12B:
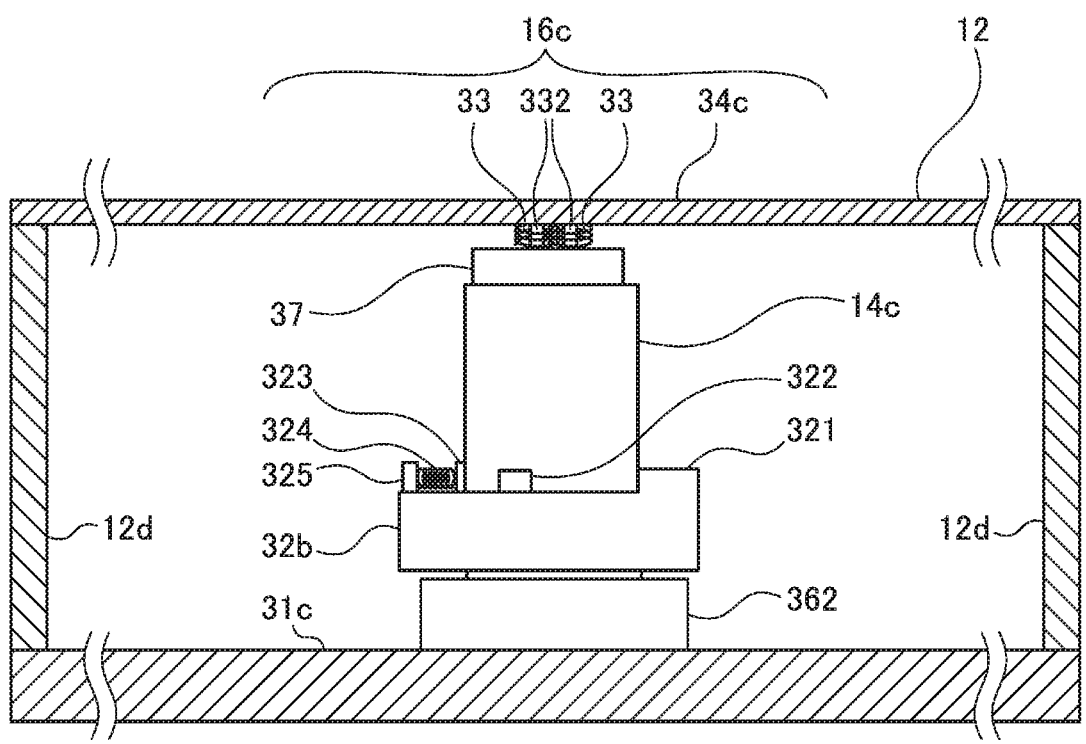

FIGS. 12A and 12B are cross-sectional views of part of the prism 14c and the holder 16c in a line narrowing module according to a fourth embodiment. FIG. 12A corresponds to the cross section taken along the line VA-VA in FIG. 4. FIG. 12B corresponds to the cross section taken along the line VC-VC in FIG. 4.

The lower plate 31b and the upper plate 34b in the third embodiment are replaced with a bottom plate 31c and a top plate 34c of the enclosure 12 in the fourth embodiment. The high-head bolts 357 in the third embodiment are not used in the fourth embodiment.

The enclosure 12 has the same configuration as that of the enclosure 12 described with reference to FIGS. 1 and 2. The bottom plate 31c of the enclosure 12 defines the lower surface of the enclosure 12, and the top plate 34c of the enclosure 12 defines the upper surface of the enclosure 12. The top plate 34c of the enclosure 12 may be an upper lid of the enclosure 12.

The rotation mechanism 36 can rotate the support plate 32b and the prism 14c relative to the bottom plate 31c of the enclosure 12.

A plurality of recesses 343 are formed in the lower surface of the top plate 34c of the enclosure 12. The plurality of recesses 343 include two recesses. Part of each of the two springs 33 is located in the corresponding recess 343. A plurality of pins 332 are located in the springs 33, and part of each of the pins 332 is buried in a pin hole 371 of the prism clamp 37. The springs 33 therefore do not come off the recesses 343.

A side wall 12d of the enclosure 12 specifies the distance from the top plate 34c to the bottom plate 31c. Further, the side wall 12d of the enclosure 12 fixes the attitude of the top plate 34c to prevent the top plate 34c from rotating relative to the bottom plate 31c.

The bottom plate 31c corresponds to the first element in the present disclosure. The top plate 34c corresponds to the fourth element in the present disclosure. The side wall 12d corresponds to the sixth element in the present disclosure.

The other points are the same as those in the third embodiment. The responsiveness of the rotational control performed on the prism 14c can be improved also in the fourth embodiment as in the third embodiment.

6. Others

The above description is intended not to be limiting but merely to be exemplary. It will therefore be apparent for a person skilled in the art that the embodiments of the present disclosure can be changed without departing from the accompanying claims.

The terms used in the entire specification and accompanying claims should each be construed as a "non-limiting" term. For example, the term "include" or "included" should be construed as "does not necessarily include only what is described." The term "have" should be construed as "does not necessarily have only what is described." Further, an indefinite article "a" described in the present specification and the accompanying claims should be construed as a term that means "at least one" or "one or more."

What is claimed is:

1. A line narrowing module configured to narrow a linewidth of laser light, comprising a prism configured to refract the laser light in a first plane, and a grating configured to disperse the laser light in the first plane,
the line narrowing module further comprising a first element, a rotation mechanism, a second element, a third element, and a fourth element,
the second element being supported between the first element and the fourth element by the first element,
the rotation mechanism being configured to rotate the second element relative to the first element around an axis that intersects the first plane,
the prism being located between the second element and the fourth element and so supported by the second element that the rotation mechanism rotates the prism along with the second element,
the third element having elasticity and being compressed and located between the prism and the fourth element,
the fourth element receiving reaction force from the compressed third element, and
the second element being mechanically independent of the fourth element in a direction of rotation caused by the rotation mechanism.

2. The line narrowing module according to claim 1, further comprising a fifth element,
wherein the fifth element is configured to specify a distance between the second element and the fourth element in a direction of the axis.

3. The line narrowing module according to claim 1, further comprising a fifth element,
wherein the fifth element is fixed to the second element, the fourth element has at least one hole accepting part of the fifth element, and
the fifth element is movable relative to the hole in the direction of rotation.

4. The line narrowing module according to claim 3, wherein the second element and the fifth element are integrated with each other into a single member.

5. The line narrowing module according to claim 1, further comprising a fifth element,
wherein the fifth element is fixed to the second element, the fourth element has at least one hole accepting part of the fifth element, and
a gap is present in the direction of rotation between the hole and the fifth element in the hole.

6. The line narrowing module according to claim 5, wherein the fifth element includes a first column and a second column so located as to sandwich the prism, and
the at least one hole includes a first hole accepting part of the first column and a second hole accepting the second column.

7. The line narrowing module according to claim 6, wherein the first column includes a first bolt having a first end fixed to the second element and a second bolt inserted into the first hole and fixed to a second end of the first bolt, and
the second column includes a third bolt having a third end fixed to the second element and a fourth bolt inserted into the second hole and fixed to a fourth end of the third bolt.

8. The line narrowing module according to claim 7, wherein the second bolt is a stepped bolt having a shoulder having a diameter smaller than a diameter of a head of the first bolt, and the fourth bolt is a stepped bolt having a shoulder having a diameter smaller than a diameter of a head of the third bolt.

9. The line narrowing module according to claim 7, wherein the second bolt has a first head being in contact with a surface, around the first hole, of the fourth element, and
the fourth bolt has a second head being in contact with a surface, around the second hole, of the fourth element.

10. The line narrowing module according to claim 1, wherein the rotation mechanism includes
a rotary plate located between the first element and the second element, and
a piezoelectric device configured to push the rotary plate in the direction of rotation at a position deviated from the axis.

11. The line narrowing module according to claim 1, wherein the second element includes
a stepped portion with which part of a side surface of the prism is in contact, and
an elastic member configured to push the prism against the stepped portion.

12. The line narrowing module according to claim 1, further comprising a prism clamp located between the prism and the third element.

13. The line narrowing module according to claim 1, further comprising a sixth element fixed to each of the first element and the fourth element.

14. The line narrowing module according to claim 13, wherein the first element and the sixth element are integrated with each other into a single member.

15. The line narrowing module according to claim 13, wherein the fourth element and the sixth element are integrated with each other into a single member.

16. The line narrowing module according to claim 1, further comprising an enclosure accommodating the prism,
wherein the first element is part of the enclosure, and the fourth element is another part of the enclosure.

17. A line narrowing module configured to narrow a linewidth of laser light, comprising a prism configured to refract the laser light in a first plane, and a grating configured to disperse the laser light in the first plane;
the line narrowing module further comprising a first element, a rotation mechanism, a second element, a third element, a fourth element, and a fifth element,
the second element being supported between the first element and the fourth element by the first element,
the rotation mechanism being configured to rotate the second element relative to the first element around an axis that intersects the first plane,
the prism being located between the second element and the fourth element and so supported by the second element that the rotation mechanism rotates the prism along with the second element, the third element having elasticity and being compressed and located between the prism and the fourth element, the fourth element receiving reaction force from the compressed third element, the fifth element being fixed to the second element, the fourth element having a hole accepting part of the fifth element, a gap being present in a direction of rotation caused by the rotation mechanism between the hole and the fifth element in the hole.

18. A line narrowing module configured to narrow a linewidth of laser light, comprising a prism configured to refract the laser light in a first plane, and a grating configured to disperse the laser light in the first plane, the line narrowing module further comprising a first element, a rotation mechanism, a second element, a third element, a fourth element, and a sixth element, the second element being supported between the first element and the fourth element by the first element, the rotation mechanism being configured to rotate the second element relative to the first element around an axis that intersects the first plane, the prism being located between the second element and the fourth element and so supported by the second element that the rotation mechanism rotates the prism along with the second element, the third element having elasticity and being compressed and located between the prism and the fourth element, the fourth element receiving reaction force from the compressed third element, the sixth element being fixed to each of the first element and the fourth element.

19. The line narrowing module according to claim 18, further comprising an enclosure accommodating the prism, wherein the first element is part of the enclosure, the fourth element is another part of the enclosure, and the sixth element is further another part of the enclosure.

* * * * *